Patented Nov. 30, 1948

2,455,088

UNITED STATES PATENT OFFICE 2,455,088

ANTIOXIDANT

Wilbur I. Patterson, Fairfax, Va., and Martin B. Williamson, Darby, Pa., assignors, by mesne assignments, to Wyeth Incorporated, Philadelphia, Pa., a corporation of Delaware No Drawing. Application May 18, 1945, Serial No. 594,592

5 Claims. (Cl. 252—398)

This invention relates to an antioxidant derived from an edible substance. It particularly relates to an antioxidant derived from rice bran. Such an antioxidant finds industrial application in retarding oxidative deterioration in medicinals and foods, especially of the type containing an appreciable percentage of fats.

This is a continuation-in-part application of our U. S. patent application, Serial No. 499,572 filed August 21, 1943, entitled Antioxidants, now Patent No. 2,380,546, dated July 31, 1945, wherein there is described and claimed a procedure of obtaining an effective antioxidant comprising extracting a rice bran concentrate with a halogenated hydrocarbon, treating the thus obtained halogenated hydrocarbon extract with an aqueous liquid under alkaline conditions, re-extracting the aqueous extract under acidic conditions with the halogenated hydrocarbon, and distilling off the halogenated hydrocarbon from the resulting extract.

A potent antioxidant can also be prepared in the manner hereinafter described from commercially available concentrates obtained by aqueous or aqueous alcoholic extraction of rice bran. Thus, 250 lbs. of an aqueous rice bran concentrate was poured as a thin stream with vigorous stirring into 500 gallons of methanol. The mixture was allowed to stand overnight, then the clear methanol solution was siphoned off and the precipitated solid material separated from the remaining methanol solution by filtration. The combined methanol solutions were concentrated to a syrupy consistency by distillation in vacuo under an atmosphere of nitrogen. The distillation was continued until all the methanol had been removed together with part of the water contained in the original rice bran concentrate. The syrupy residue, designated "A" for convenience, was about twice as effective in antioxygenic potency as the original rice bran concentrate.

The syrupy residue was subjected to a continuous diethyl ether extraction by one of the conventional continuous cyclic procedures. At sixty-hour intervals, the extraction was interrupted and the ether solution of the extracted material replaced by fresh ether. When no further antioxidant material was extracted by fresh ether, the ether was distilled off from the combined ether extracts to obtain a viscous syrup, the final distillation being conducted in vacuo at 50° C.

The viscous syrup, designated "B" for convenience, was approximately five times as potent in antioxygenic activity as the syrupy residue "A" from the methanol treatment.

"B" was dissolved in a minimum of an aqueous alkali solution but in sufficient amount to give the solution an alkalinity of about pH 12, and the solution subjected to continuous ether extraction. Upon distilling off the ether from combined ether extracts, a small residue was obtained but this residue possessed only slight antioxygenic activity and was discarded.

The alkaline solution which had been ether extracted was next acidified to a pH of 3 to 6.5 by means of a mineral acid such as hydrochloric and the aqueous extract was extracted with diethyl ether until substantially all antioxidative activity was removed from the aqueous layer. The diethyl ether is evaporated, and the residue may be used as such for protecting substances subject to oxidation or may be further concentrated and purified by distillation under vacuo. The amounts of these various fractions "A" and "B" which will preserve linoleic acid over a period of three weeks at 30° C., is shown in the following table together with the concentration achieved at each stage of the purification.

*Table*

| Fraction | Weight required for 3 week protection of linoleic acid, mg. | Concentration factor |
| --- | --- | --- |
| Rice-bran concentrate | 800 | 1 |
| A—Syrupy residue from methanol extraction | 522 | 1.5 |
| B—Ether extract of A | 92 | 9 |

An advantage of the above disclosed process is that the original aqueous rice bran concentrate can be used after the treatment for whatever purpose the concentrate was originally intended since no vitamin content is removed. The product resulting from the process is non-toxic hence is especially useful in retarding oxidative deterioration of foods, for instance in retarding rancidity of fats in dried milk powder.

It is obvious that the above description of the procedure is intended to be illustrative only and that it may be varied or modified to a certain extent without departing from the spirit of the invention or sacrificing the advantages thereof.

We claim:

1. The process of preparing an antioxidant from rice bran concentrate, comprising extracting antioxygenic principles from said concentrate with methanol, distilling off the solvent from the methanol solution to obtain a syrupy residue, extracting antioxygenic principles from said syrupy residue with diethyl ether, and removing the ether from the ethereal extract, said extract having the property of reacting with alkali to form salts which are insoluble in diethyl ether.

2. An antioxidant prepared from rice bran concentrate in accordance with the process set forth in claim 1.

3. The process of claim 1, with the additional step comprising purifying the ethereal extract to obtain a highly active antioxidant product by concentrating the last mentioned extract and distilling the concentrated antioxidant material under subatmospheric pressure.

4. The process of preparing an antioxidant comprising, treating rice bran with a medium selected from the group consisting of water and an aqueous alcoholic solution to obtain a solution containing desired antioxidants in impure form, precipitating undesired impurities from said solution by treatment with methanol, separating and discarding the precipitate, removing methanol from the treated solution by distillation to obtain a residue containing antioxygenic principles, extracting said principles from said residue with diethyl ether, and distilling off ether from the ethereal extract to obtain an active antioxidant product said product having the property of reacting with alkali to form salts which are insoluble in diethyl ether.

5. The process of preparing an antioxidant comprising obtaining a concentrate from rice bran, extracting antioxygenic principles from said concentrate with methanol, distilling off methanol from the methanol solution to obtain a residue, extracting antioxygenic principles from said residue with diethyl ether, removing ether from the ethereal extract to obtain a second residue, dissolving the latter in an aqueous alkali solution, extracting said solution with diethyl ether and discarding the ether extract, acidifying the aqueous solution to form an acid solution, removing the antioxygenic principles by extracting said acid solution with diethyl ether and removing ether from the ethereal extract to obtain the desired antioxidant.

WILBUR I. PATTERSON.
MARTIN B. WILLIAMSON.

REFERENCES CITED

The following references are of record in the file of this patent:

UNITED STATES PATENTS

| Number | Name | Date |
|---|---|---|
| 2,098,254 | Mattill et al | Nov. 9, 1937 |
| 2,176,034 | Musher | Oct. 10, 1939 |
| 2,181,765 | Musher | Nov. 28, 1939 |
| 2,188,319 | Siemers | Jan. 30, 1940 |
| 2,232,555 | Musher | Feb. 18, 1941 |
| 2,345,578 | Buxton | Apr. 4, 1944 |